UNITED STATES PATENT OFFICE.

JAN LAGUTT, OF BASEL, SWITZERLAND.

ANTIPYRETIC, O-SULFAMIDOBENZOYL-P-PHENETIDIN, AND PROCESS FOR PRODUCING THE SAME.

1,153,121. Specification of Letters Patent. Patented Sept. 7, 1915.

No Drawing. Application filed July 7, 1915. Serial No. 38,554.

*To all whom it may concern:*

Be it known that I, JAN LAGUTT, Phil. Dr., of Basel, Swiss Republic, have invented a certain new and useful Antipyretic, o-Sulfamidobenzoyl-p-phenetidin, and Process for Producing the Same, of which the following is a specification.

Remsen & Dohme by heating o-benzoic acid sulfimid or o-sulfamido-benzoic acid methyl ester with anilin, have produced the anilid

o-$NH_2SO_2.C_6H_4.CONH.C_6H_5$, and analogously, also o- and p-toluid (*American Chemical Journal* 11, 346). None of these compounds has acquired any technical importance. It has now been found that by the reaction of p-phenetidin on o-benzoic acid sulfimid or o-sulfamidobenzoic acid alkylester, o-sulfamidobenzoyl-p-phenetidin

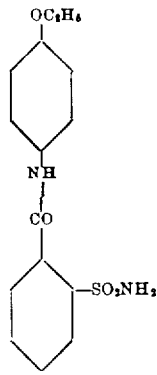

is obtained, which, being non poisonous *per se*, constitutes a valuable medicament on account of its anti-pyretic and hypnotic effects on the animal organism. As the analogously built-up compounds: anisyl, benzoyl and salicyl phenetidin have little or no action the strongly pronounced therapeutical effects of o-sulfamidobenzoyl-p-phenetidin could not but be surprising. They are attributable to the circumstance that by the entering of the sulfamido group into the benzoyl residue of the acetyl-phenetidin its stability or resistance as against the saponifying action of acids is not diminished, while it is greatly reduced as against that of alkalis. After four hours digestion of o-sulfamidobenzoyl-p-phenetidin with 100 times the quantity of $$\frac{n}{10}$$ hydrochloric acid at 36° C. it was impossible, just as in the case of acetyl-p-phenetidin, to discover even traces of saponification. Saponification tests with 100 times the quantity of $$\frac{n}{10}$$

soda solution give the following results:—

| Phenetidin separated. | o-Sulfamido-benzoyl-p-phenetidin. | Acetyl-p-phenetidin. |
|---|---|---|
| After 3 hours at 36°  | 3.2% | 1.6% |
| After 1 hour at 95°  | 14.4% | 3.2% |

According to these results o-sulfamidobenzoyl-p-phenetidin would pass undecomposed through the stomach, while in the alkaline reaction in the intestines it will be separated into p-phenetidin and o-benzoic acid sulfimid.

A compound of o-benzoic acid sulfimid and p-phenetidin has already been described in the British specification No. 25151/1899 but what was in question there was a saccharin salt of p-phenetidin, having a melting point of 90 to 100° C. and entirely different properties and obtainable by double decomposition of barium saccharinate with p-phenetidin sulfate.

Example: 80 parts of p-phenetidin are mixed with 106.4 parts of o-benzoic acid sulfimid and heated for 5–6 hours to 120° out of contact with the air. The melt which is at first very fluid, gradually becomes very solid in this operation. It is boiled (heated to ebullition) with about 500 parts of water, and allowed to cool under constant stirring: soda is then added until it gives a slightly alkaline reaction, in order to bring into solution any o-benzoic acid sulfimid which may not have entered into the reaction, and the sandy crystalline powder is then filtered off. After edulcoration with cold water, and drying, the raw product presents the form of a light gray powder which can be easily purified by recrystallization from toluene or alcohol. Instead of o-benzoic acid sulfimid, o-sulfamidobenzoic acid methylester or ethyl ester may be used in the foregoing example. The o-sulfamidobenzoyl p-phenetidin thus obtainable is a snow-white, lustrous, tasteless crystalline powder having a melting point of 171 to 172° C. It is soluble in water at 15°, in the ratio of 1:900, at boiling temperature 1:300, in alcohol at 15° in the ratio of 1:37, in boiling alcohol in the ratio of 1:7. In its physiological effects it resembles pyramidon, but is less poisonous than the latter.

What I claim and desire to secure by Letters Patent is:

1. Process for the production of o-sulfamidobenzoyl-p-phenetidin, comprising heating o-benzoic acid sulfimid or with p-phenetidin in molecular proportions.

2. As a new article of manufacture o-sulfamidobenzoyl-p-phenetidin, being a white, lustrous, tasteless, crystalline substance having a melting point of 171–172° C., soluble in water and alcohol, substantially as described.

In witness whereof, I have hereunto signed my name in the presence of two subscribing witnesses.

Dr. JAN LAGUTT.

Witnesses:
 WERNER HAUFFACBERG,
 ARNOLD ZUBER.

It is hereby certified that in Letters Patent No 1,153,121, granted September 7, 1915, upon the application of Jan Lagutt, of Basel, Switzerland, for an improvement in "Antipyretic, O-Sulfamidobenzoyl-P-Phenetidin, and Processes for Producing the Same," an error appears in the printed specification requiring correction as follows: Page 2, line 24, claim 1, strike out the word "or;" and that the said Letters Patent should be read with this correction therein that the same may conform to the record of the case in the Patent Office.

Signed and sealed this 18th day of January, A. D., 1916.

[SEAL.]

J. T. NEWTON,
*Acting Commissioner of Patents.*

Cl. 23—24.